(12) United States Patent
Martin et al.

(10) Patent No.: US 10,690,339 B2
(45) Date of Patent: Jun. 23, 2020

(54) BURNER FOR A FURNACE AND A METHOD OF ASSEMBLY (71) Applicant: Honeywell International Inc., Morris Plains, NJ (US)

(72) Inventors: Richard R. Martin, Tulsa, OK (US); Matthew A. Martin, Tulsa, OK (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 324 days.

(21) Appl. No.: 15/685,714

(22) Filed: Aug. 24, 2017

(65) Prior Publication Data
US 2018/0135852 A1  May 17, 2018

Related U.S. Application Data (60) Provisional application No. 62/422,407, filed on Nov. 15, 2016.

(51) Int. Cl.
F23D 14/06 (2006.01)
F23D 14/08 (2006.01)
B23P 15/00 (2006.01)
F23D 14/58 (2006.01)
F23D 14/64 (2006.01)

(52) U.S. Cl.
CPC .............. F23D 14/06 (2013.01); B23P 15/00 (2013.01); F23D 14/08 (2013.01); F23D 14/58 (2013.01); F23D 14/64 (2013.01); F23D 2900/14004 (2013.01)

(58) Field of Classification Search
CPC .......... B23P 15/00; F23D 14/06; F23D 14/08; F23D 14/64; F23D 14/58; F23D 2900/14004
See application file for complete search history.

(56) References Cited

U.S. PATENT DOCUMENTS

| 2,348,011 | A |   | 5/1944  | Koppel         |            |
|-----------|---|---|---------|----------------|------------|
| 2,655,210 | A |   | 10/1953 | Neuls          |            |
| 4,505,666 | A |   | 3/1985  | Martin et al.  |            |
| 5,195,884 | A |   | 3/1993  | Schwartz et al.|            |
| 5,238,395 | A | * | 8/1993  | Schwartz       | F23C 9/006 |
|           |   |   |         |                | 431/10     |

(Continued)

FOREIGN PATENT DOCUMENTS

EP        1495262 B1     4/2015

OTHER PUBLICATIONS

International Preliminary Report on Patentability for PCT Application No. PCT/US2017/056037, dated May 21, 2019.

(Continued)

Primary Examiner — Alfred Basichas (57) ABSTRACT

Premixed fuel and air are emitted in a staged fashion from a burner. A header delivers premixed fuel and air to a primary stage of combustion through a first plurality of outlets in communication with the pre-mixer. The same or another header may deliver premixed fuel and air to a secondary stage of combustion through a second plurality of outlets. A tile wall is located on the tile between the first plurality of outlets and the second plurality of outlets. A candelabra piece made of metal may comprise the pre-mixer and the header. In assembly, the candelabra piece may be inserted into the burner tile.

17 Claims, 6 Drawing Sheets (56) References Cited

U.S. PATENT DOCUMENTS

| | | |
|---|---|---|
| 6,616,442 B2 | 9/2003 | Venizelos et al. |
| 6,877,980 B2 | 4/2005 | Stephens et al. |
| 2001/0034001 A1* | 10/2001 | Poe .......................... F23C 9/08 431/116 |
| 2010/0021853 A1 | 1/2010 | Bussman |
| 2012/0270161 A1 | 10/2012 | Poe et al. |
| 2015/0133709 A1 | 5/2015 | Martin |
| 2016/0018104 A1 | 1/2016 | Martin |
| 2016/0018105 A1 | 1/2016 | Martin |
| 2016/0018110 A1 | 1/2016 | Stuttaford et al. |
| 2016/0076762 A1 | 3/2016 | Kraus |

OTHER PUBLICATIONS

Search Report dated Feb. 21, 2018 for corresponding PCT Appl. No. PCT/US2017/056037.

* cited by examiner

BURNER FOR A FURNACE AND A METHOD OF ASSEMBLY

CROSS-REFERENCE TO RELATED APPLICATION

This application claims priority from Provisional Application No. 62/422,407 filed Nov. 15, 2016, the contents of which cited application are hereby incorporated by reference in its entirety.

FIELD

This invention relates generally to a burner which may be used in a furnace, and a method of assembly.

BACKGROUND

Petroleum refining and petrochemical processes frequently involve heating process streams in a furnace. The interior chamber of the furnace contains tubes which contain process streams. The interior chamber is heated by a plurality of burners which receive a fuel which combusts to produce heat.

Some burners are "raw gas" or "nozzle mix" burners. In this design, fuel and combustion air do not mix until the fuel and combustion air enter a primary combustion zone downstream from the fuel nozzle, perhaps inside an interior chamber of the furnace. While the flames associated with such burners are well-defined, the flames have a tendency to produce high levels of nitrous oxide (NOx) emissions, which is undesirable, and in some cases, exceed government emissions regulations.

In order to minimize the formation of combustion-generated NOx emissions, staged fuel burners have been used in refinery and petro-chemical plant heaters. Numerous modifications have been made to the design of staged fuel burners in attempts to improve the reduction of the NOx emissions generated during combustion.

Low-NOx emissions fuel burners are staged to provide the minimum possible combustion generated NOx emissions levels. To accomplish "staging" the staged fuel burners have multiple fuel gas tips (typically eight or more) and multiple fuel manifolds. These gas tips have very small discharge ports and are located in the vicinity of combustion zones that contain combustion products that have a very high temperature. As a result, the tips can overheat. The overheating, coupled with occasional debris in the fuel, can lead to significant plugging of the discharge ports. The susceptibility to plugging reduces performance and increases the maintenance required for cleaning, each of which impacts the output and production levels of a refinery or processing plant.

Since they have multiple tips, these types of burners can be expensive. Additionally, the complicated tips require a significant amount of installation time. Beyond the initial installation, replacing damaged burners can be problematic because the downtime can negatively impact the output and production levels of a refinery or processing plant.

Therefore, it would be desirable to have a burner that addresses one or more of these problems.

SUMMARY

A new burner has been developed that can be used in a processing furnace to produce a well-defined flame pattern. The burner produces minimal nitrous oxide and carbon monoxide emissions. In the burner, fuel and air are premixed in a pre-mixer downstream of a fuel source and an air source. Premixed fuel and air are emitted in a staged fashion. A header delivers premixed fuel and air to a primary stage of combustion through a first plurality of outlets in communication with the pre-mixer. The same or another header may deliver premixed fuel and air to a secondary stage of combustion through a second plurality of outlets. A tile wall may be located on a tile between the first plurality of outlets and the second plurality of outlets. A candelabra piece made of metal may comprise the pre-mixer and the header. In assembly, the candelabra piece may be inserted into the burner tile.

BRIEF DESCRIPTION OF THE DRAWINGS

The drawings are simplified process diagrams in which.

DETAILED DESCRIPTION

A burner and assembly method have been developed for use in a furnace having process tubes. The burner utilizes a premixer for both the "primary fuel" and the "secondary fuel" (or "staged fuel"). The premix design in combination with the new improved burner design significantly improves the fuel air mixing which improves flame quality. Additionally, the design reduces the tendency for the flame to produce high levels of carbon monoxide. Moreover, the flame is well-defined and will not impinge (or sway) onto process tubes. The burner is designed for ease of assembly.

Figure 1:
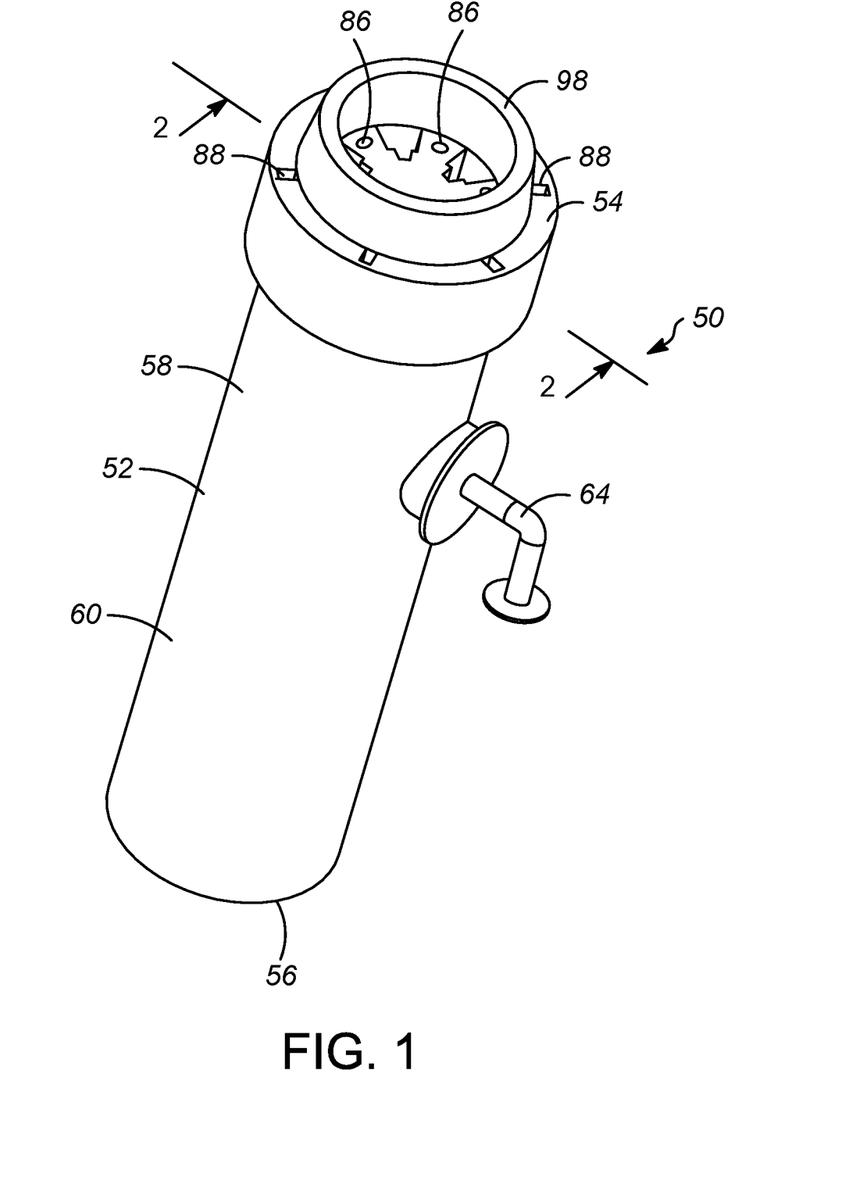
FIG. 1 is a perspective view of a burner according to one or more embodiments of the present invention.

As shown in FIG. 1, a burner 50 is disclosed which includes a wind box 52 and a tile 54. The wind box 52 includes a first end 56, a second end 58, and a body 60 between the first end 56 and the second end 58. The tile 54 includes a wall 98 which may be annular that is interposed between a first plurality of outlets 86 defining a first stage and a second plurality of outlets 88 defining a second stage of combustion.

Figure 2:
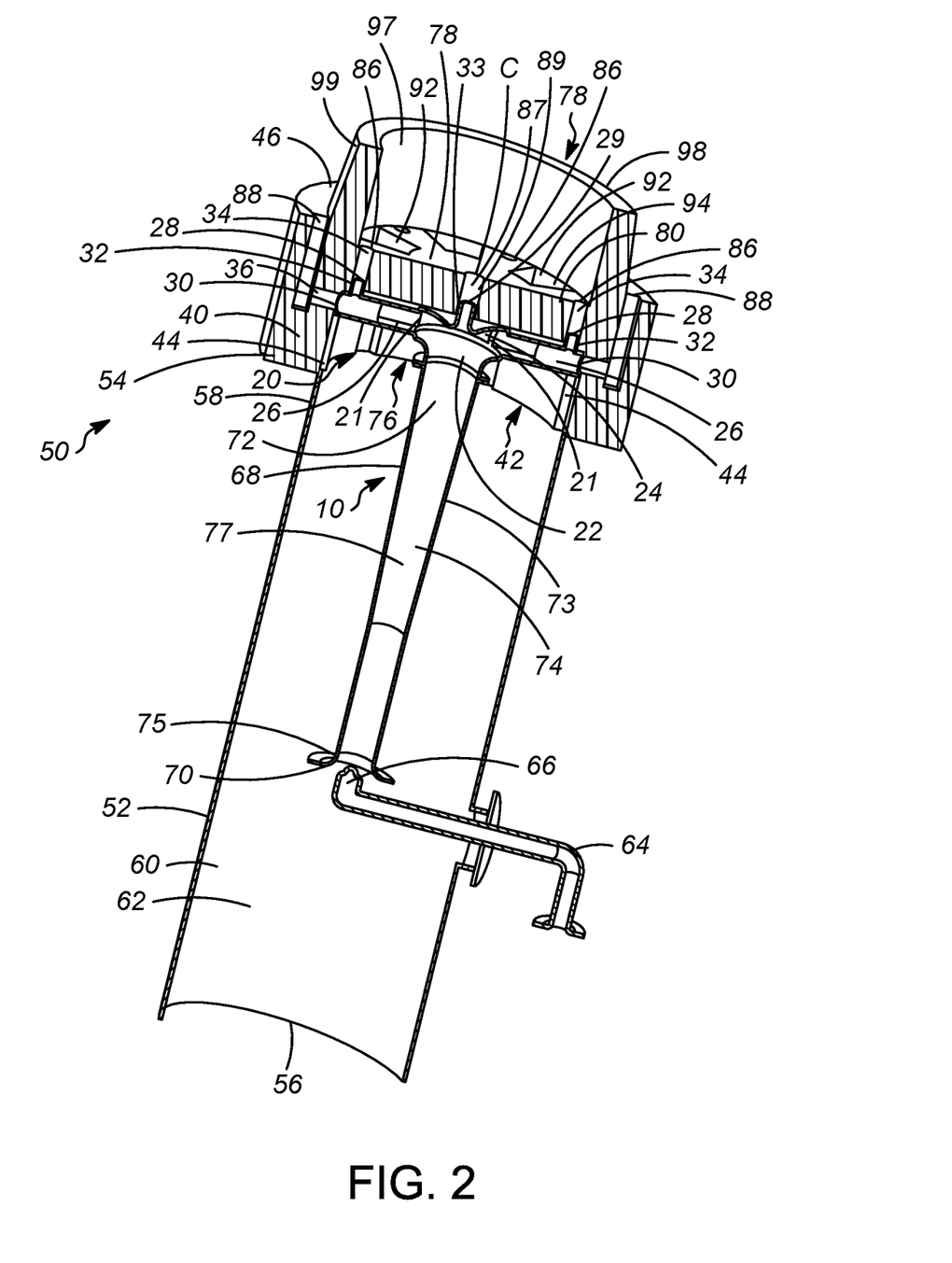
FIG. 2 is a cutaway top and side perspective view of the burner of FIG. 1 taken along segment 2-2 in FIG. 1.

As shown in FIG. 2, the body 60 of the wind box 52 defines a cavity 62. The first end 56 of the wind box 52 is open so that air can flow into the cavity 62. Instead of a natural draft burner, a fan or blower can be present to force air into the wind box 52 to create a forced air burner. The second end 58 of the wind box 52 is disposed adjacent the tile 54.

With reference to both FIGS. 1 and 2, fuel line 64 passes through the body 60 of the wind box 52 and into the cavity 62 of the wind box 52. As shown in FIG. 2, an outlet 66 for the fuel line 64 is disposed within the cavity 62 of the wind box 52 adjacent to a pre-mixer 68.

As shown in FIG. 2, a candelabra piece 10 includes a pre-mixer 68 and a header 20. The candelabra piece 10 may be made of metal such as Stainless steel or carbon steel. The pre-mixer 68 is constructed from the same material as the header 20 and is integral therewith. It is also contemplated that the pre-mixer 68 and the header 20 are not integral, but the two may be secured together such as through a flanged connection secured with bolts. In an aspect the pre-mixer 68 and the header 20 may be of a unitary construction.

The pre-mixer 68 includes an open first end 70, a second end 72, and a tubular wall 73 extending between the first end and the second end defining a passageway 74 between the first end 70 and the second end 72. The pre-mixer 68 is in downstream communication with a source of combustion air and a source of fuel. The first open end 70 of the pre-mixer 68 may be disposed adjacent and spaced apart from the outlet 66 of the fuel line 64, which may be a source of fuel, so that as fuel flows from the outlet 66 to the pre-mixer 68, combustion air from the cavity 62 of the wind box 52, which may be the source of combustion air, may be drawn into the passageway 74 of the pre-mixer 68. The wall 73 defines the passageway 74 of the pre-mixer 68 to include a venturi 75 at the first end 70. The venturi 75 may have a frustoconical or bell-shaped configuration that gradually reduces the inner diameter of the passageway 74 while progressing deeper into the passageway 74. The fuel and the portion of the combustion air that is drawn into the pre-mixer 68 will mix together. The venturi 75 will accelerate the speed of the mixture to enhance mixing of air and fuel. The pre-mixer 68 may include a diverging frustoconical section 77 downstream of the venture 75 to decelerate the mixture before exiting the pre-mixer 68. The mixture of the fuel and combustion air is passed out the second end 72 of the pre-mixer 68 to the header 10.

The term "communication" means that material flow is operatively permitted between enumerated components. The term "downstream communication" means that at least a portion of material flowing to the subject in downstream communication may operatively flow from the object with which it communicates.

The header 20 may include an inlet 22 in downstream communication with a second end 72 of the pre-mixer 68. The header 20 may comprise a central hub 24 in downstream communication with the inlet 22 and the second end 72 of the pre-mixer 68. The header 20 further comprises a plurality of metal conduits 26 extending from and in downstream communication with the central hub 24 and the inlet 22. The plurality of conduits each have an inlet 21 in downstream communication with the second end 72, the inlet 21 and the central hub 24. The conduits 26 may radially extend from the central hub 24. Each conduit may include a first port 28 and a second port 30.

The tile 54 includes a first side 76 and a second side 78. A tile wall 98 extends away from the first side 76 of the tile 54. The tile wall 98 may be supported on the second side 78. The tile wall 98 may be integral with the tile 54 and may have an annular or cylindrical configuration. Non-cylindrical or looped configurations of the tile wall 98 are contemplated. The tile wall 98 may have an inner surface 97 and an outer surface 99. The outer surface 99 of the tile wall 54 may be beveled so as to incline outwardly while moving toward the first side 76.

The second end 58 of the wind box 52 is disposed adjacent to the tile 54, preferably at or near the first side 76. Other configurations between the wind box 52 and the tile 54 are also contemplated. Additionally, the second end 72 of the pre-mixer 68 may be adjacent to the first side 76 of the tile 54.

The first plurality of outlets 86 are located inwardly of the tile wall 98 and the second plurality of outlets 88 are located outwardly of the first plurality of outlets relative to a center "C" of the tile 54. In an aspect, the first plurality of outlets 86 are located inwardly of the inner surface 97 of the tile wall 98 and the second plurality of outlets 88 are located outwardly of the inner surface 97 of the tile wall 98. In an aspect, the second plurality of outlets 88 may be located outwardly of the second surface 99 of the tile wall 98. Each of the first plurality of outlets 86 and each of the second plurality of outlets 88 may be oriented off vertical to direct the mixture toward the center "C" of the tile 54.

A third plurality of openings 92 in the first side 78 located inwardly of the tile wall 98 may provide air from the wind box 52 from channels 94 extending from the first side 76 to the second side 78 of the tile 54 to communicate the wind box 52 with the second side 78.

In an embodiment, the first plurality of outlets 86 are in downstream communication with the header 20. In a further embodiment, the second plurality of outlets 88 are in downstream communication with the header 20. In an aspect, each conduit 26 may be in upstream communication with a respective one of the first plurality of outlets 86 and a respective one of the second plurality of outlets 88. Consequently, mixed combustion air and fuel from the pre-mixer 68 exits the second end 72 of the pre-mixer, enters into the inlet 22 of the header 20 to the hub 24 and is distributed from the hub 24 through respective inlets into the conduits 26. A respective first outlet 86 in the first plurality of outlets 86 may be in downstream communication with a first port 28 of each conduit 26. Moreover, a respective second outlet 88 of the second plurality of outlets 88 may be in downstream communication with a second port 30 of each conduit 26. Each respective first outlet and each respective second outlet in downstream communication with the same conduit 26 may define a line with the center C of the tile 54.

The term "upstream communication" means that at least a portion of the material flowing from the subject in upstream communication may operatively flow to the object with which it communicates.

In an embodiment, the first plurality of outlets 86 are located in the second side 78 of the tile 54. Moreover, in an embodiment the second plurality of outlets 88 are located in the second side 78 of the tile 54. In this embodiment, the tile 54 provides the first plurality of outlets 86 and the second plurality of outlets 88 for the burner 50 by expelling a mixture of combustion air and fuel to form a flame.

In the embodiment shown in FIG. 2, the tile 54 may include a platform 80 and a deep wall 40. The deep wall 40 may be annular or looped and extend from the first side 76 away from the second side 78 of the tile 54. The platform 80 is provided inwardly of the tile wall 98. The platform 80 and the deep wall 40 define a recess 42 in the first side 76 of the tile 54. The first plurality of outlets 86 may be disposed in the platform 80 on the second side 78 of the tile. The deep wall 40 establishes a floor 46 on the second side 78 of the tile 54 that provides the second plurality of outlets 88.

In an embodiment, each conduit 26 includes a first pipe 32 that provides the port 28. The first pipe 32 axially extends from the header 20 and specifically from the respective conduit 26 to provide the port 28 distal from the conduit 26. The tile 54 includes a first plurality of channels 34 extending axially through the tile 54 from the first side 76 to the second side 78 to define the first plurality of outlets 86 in the second side 78 of the tile 54. The first plurality of channels 34 may extend though the platform 80. The first plurality of pipes 32 extend from the header 20 specifically from the respective conduit 26 through ports 28 to a respective one of the first plurality of channels 34 to provide the mixture of combustion air and fuel to the respective one of the first plurality of outlets 86. Each first pipe 32 may extend to or into the respective one of the first plurality of channels 34.

A central channel 89 may extend axially through the center C of the tile 54 from the first side 76 to the second side 78 to define a central outlet 87 in the second side 78. The central outlet 87 may be included among the first plurality of outlets. The central channel 89 may extend axially though the platform 80. A central pipe 33 may extend axially from the header 20, specifically from the hub 22, in downstream communication with the second end 72 of the pre-mixer 10. The central pipe 33 provides a port 29 distal from the hub 22. The central pipe 33 may extend to or into the central channel 89. The central pipe 33 extends from the header 20 specifically from the hub 22 to the central channel 89 to provide the mixture of combustion air and fuel to the central outlet 87.

In a further embodiment, a second plurality of channels 36 extend through the tile 54 to define the second plurality of outlets 88 in the second side 78 of the tile 54. In an aspect, each of the channels 36 in the second plurality of channels comprise a radial passage and an axial passage that join and define the outlet 88. The second plurality of channels 36 may extend axially though the deep wall 40. Each of the conduits 26 defines the port 30 in its outer end and extend to a respective one of the second plurality of channels 36 to provide the secondary mixture of combustion air and fuel to a respective one of the second plurality of outlets 88. Specifically, the port 30 mates with the radial passage of the channels 36 and the axial passage of the channels 36 provide the outlet 88.

In an embodiment, the recess 42 in the tile 54 receives the candelabra piece 10 in the first side 76. Grooves 44 may be fashioned in an inner surface of the deep wall 40 to facilitate insertion of the candelabra piece 10 into a recess 42.

The burner 10 is easily assembled by taking a tile molded of refractory or ceramic. The candelabra piece 10 is prefabricated such that metal parts are welded, cast or otherwise fastened together. The candelabra piece 10 is inserted into the recess 42 of the tile 54 defined by the deep wall 40, such that the first plurality of outlets 86 located inwardly of said tile wall 98 and the second plurality of outlets 88 located outwardly of the first plurality of outlets 86 are in downstream communication with a respective one of the metal conduits 26.

During insertion of the header 20 of the candelabra piece 10 into the recess 42 of the tile 54, outer ends of conduits 26 may ride through grooves 44. The second end 58 of the wind box 52 may be affixed to the first side 76 of the tile 54 such that the first side 76 of the tile 54 is adjacent to the second end 58 of the wind box. The wind box may be constructed of refractory or metal.

In operation a first fuel may be supplied from a fuel source through the fuel line 64 to an outlet 66 for the fuel line. The fuel exits the fuel line 64 and passes into the pre-mixer 68. As the fuel passes into the pre-mixer 68, it will draw combustion air from the wind box 52 into the pre-mixer 68. The oxygen in the combustion air and the fuel will accelerate in the venturi 75 and mix within the pre-mixer 68. The mixture may reduce velocity in the diverging section 77.

The fuel and combustion air mixture is passed from the pre-mixer 68 to the tile 54. The mixture is passed through the header 20 though the tile 54 to the first plurality of outlets 86 located inwardly of the tile wall 54 and the second plurality of outlets 88 located outwardly of the first plurality of outlets, and perhaps outwardly of the tile wall 54. Concomitantly, combustion air from the wind box 52 will also be drawn through the tile 54 though the third plurality of flow channels 94.

Combustion air will exit the first plurality of outlets 86 inside of the wall 98 and react with fuel that has exited the first plurality of outlets 86 within the wall 98 in a first combustion stage above the platform 80. The fuel in the second plurality of outlets 88 exiting outside of the wall 98 will travel up the beveled outer surface 99 of the wall 98, and react with combustion air in a second combustion stage downstream of the first combustion stage generally above or near a top of the wall 98.

In such a configuration, it is believed that approximately 15-20 vol % of the volume of fuel will be passed to inwardly of the wall 98 to the first combustion stage. The remaining amount of fuel, approximately 80-85 vol %, will pass through the tile 54 and exit outside of the first plurality of outlets 86 and perhaps outwardly of the wall 98 to the second combustion stage. This distribution of the fuel will produce a strong flame that is well-defined, but that does not have a high enough temperature to produce an unacceptable level of NOx emissions.

A flame produced by the described burner 50 will not produce excessive NOx emissions. Additionally, the flame will be strong and well-defined.

Figure 3:
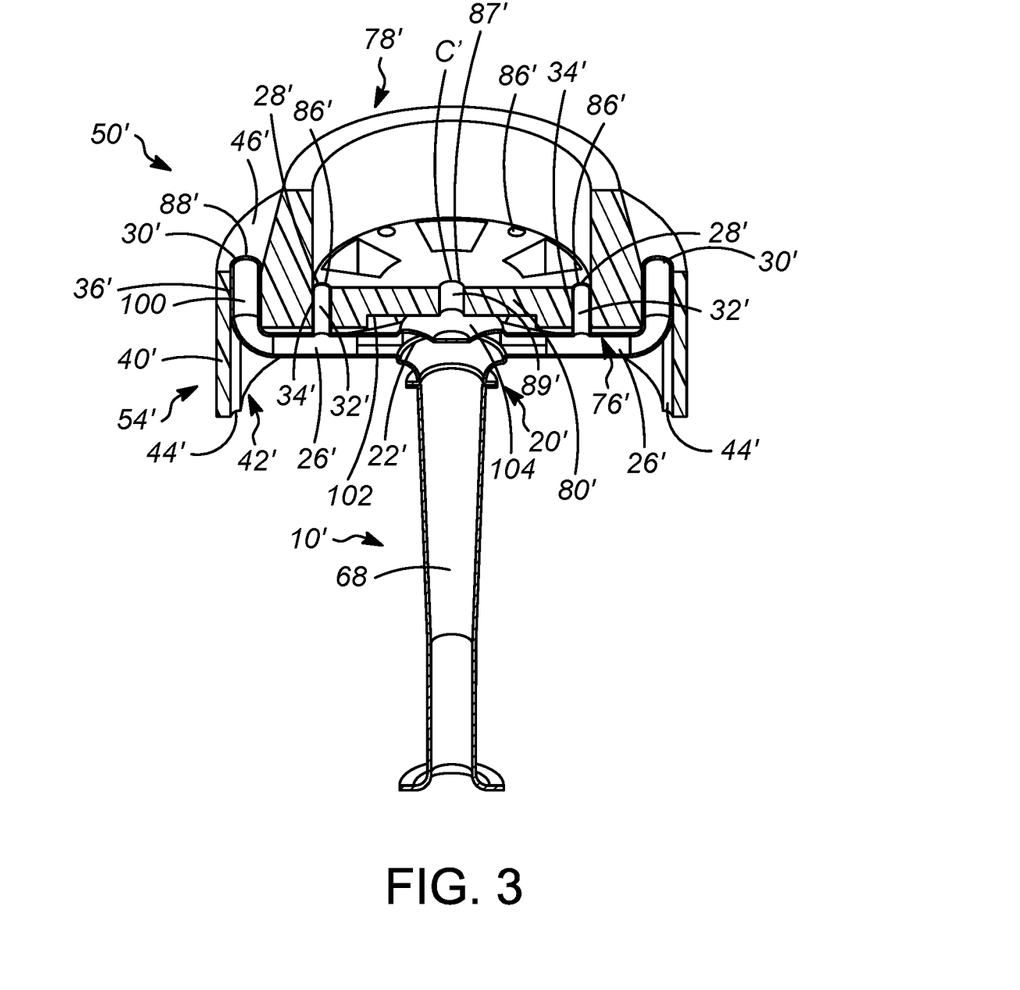
FIG. 3 is cutaway, elevational view of an alternative burner to FIGS. 1 and 2.

FIG. 3 shows an embodiment of a burner 50' with extended pipes 32' and 100 from the header 20' otherwise similar to the embodiment in FIGS. 1 and 2. Elements in FIG. 3 with the same configuration as in FIGS. 1 and 2 will have the same reference numeral as in FIGS. 1 and 2. Elements in FIG. 3 which have a different configuration than the corresponding element in FIGS. 1 and 2 will have the same reference numeral but designated with a prime symbol ('). FIG. 3 omits illustration of the wind box and fuel line. The configuration and operation of the embodiment of FIG. 3 is essentially the same as in FIGS. 1 and 2.

In the embodiment of FIG. 3, a first plurality of outlets 86' comprise ports 28' in a first plurality of pipes 32' extending from the header 20'. In an aspect, each pipe 32' in the first plurality of pipes has no more than one port 28'. A first plurality of channels 34' extend through the tile 54' from a first side 76' to a second side 78' of tile. The first plurality of pipes 32' each extend completely from respective conduits 26' from the first side 76' through a respective one of said first plurality of channels 34' axially to the second side 78' to provide respective outlets 86' above a platform 80' or at the second side 78' of the tile 54'. Accordingly, the mixture of fuel gas and combustion air is delivered from the pre-mixer 68 of the candelabra piece 10' to the header 20'. The hub 22' feeds the mixture to the first plurality of conduits 26' which feeds the mixture through respective ones of a first plurality of pipes 32' to respective ones of the first plurality of outlets 86'.

A second plurality of outlets 88' comprise ports 30' in a second plurality of pipes 100 extending from the header 20'. In an aspect, each pipe 100 in the second plurality of pipes has no more than one port 30'. A second plurality of channels 36' extend through the tile 54' from a first side 76' to a second side 78' of tile. The second plurality of pipes 100 each extend from respective conduits 26' perhaps through an elbow bend from the first side 76' through a respective one of said second plurality of channels 34' completely to the second side 78' to provide respective outlets 88'. The outlets 88' may be provided in a floor 46' provided on a deep wall 40' on the second side 78' of the tile 54'. Accordingly, the mixture of fuel gas and combustion air are delivered from the pre-mixer 68 of the candelabra piece 10' to the header 42'. The hub 22' feeds the mixture to the first plurality of conduits 26' which feeds the mixture through respective ones of a second plurality of pipes 100 to respective outlets of the second plurality of outlets 88'.

The platform 80' may be equipped with cut-out 102 above the hub 22' to accommodate a bell-shaped distributor 104 for distributing the mixture of fuel gas and combustion air to the cut-out 102 from the hub 22' of the header 20'. A central channel 89' may extend through the center C' of the tile 54' from the cut-out 102 in the first side 76' through the platform 80' to the second side 78' to define a central outlet 87' in the second side 78. The central outlet 87' may be included among the first plurality of outlets 86'. The central channel 89' extends from the cut-out 102 to the central outlet 87' to provide the mixture of combustion air and fuel from the cut-out 102 to the central outlet 87'.

The deep wall 40' is narrowed to provide a larger recess 42' to accommodate insertion of the candelabra piece 10' with the second plurality of pipes 100 extending from the conduits 26'. The second plurality of channels 36' may only extend laterally. Grooves 44' facilitate insertion of the candelabra piece into the recess 42' by allowing the outer surface of the pipes 100 to ride in the grooves 44' during insertion.

All other aspects of the configuration and operation of the embodiment of FIG. 3 is essentially the same as in FIGS. 1 and 2.

Figure 4:
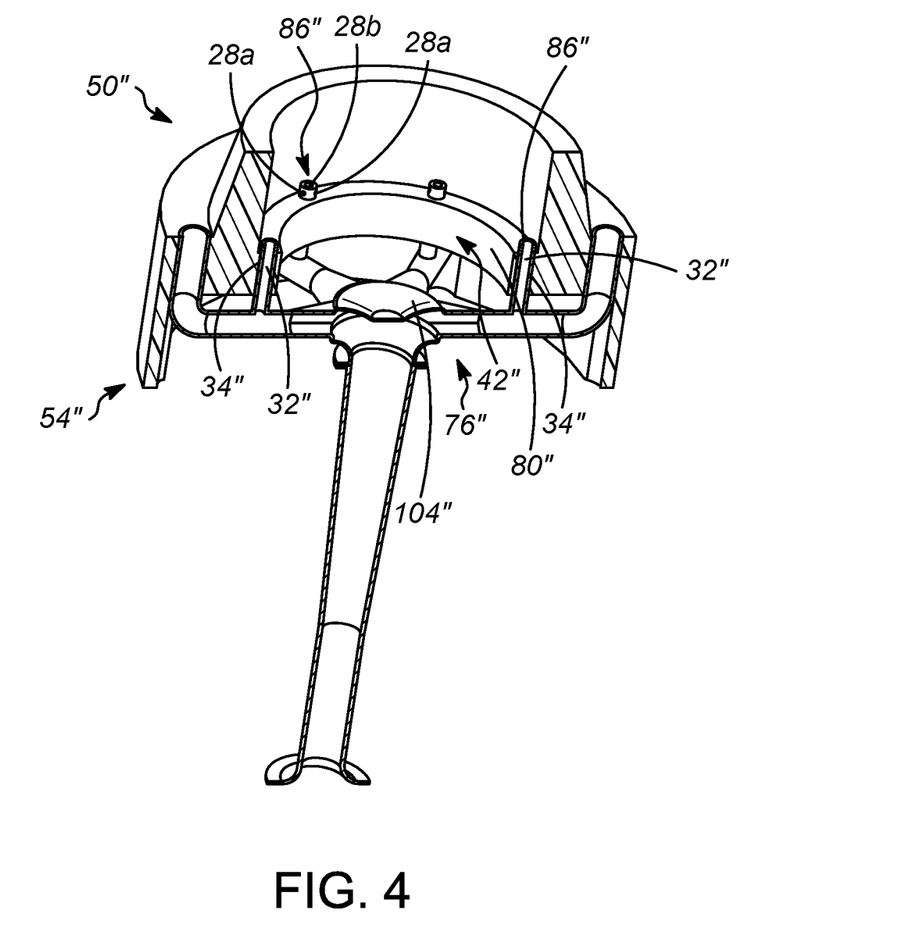
FIG. 4 is a cutaway perspective view of an alternative burner to FIG. 3.

FIG. 4 shows an embodiment of a burner 50" similar to the embodiment of FIG. 3 but with the platform 80" defining an opening 42" to permit combustion air from below perhaps from a wind box and a mixture of fuel and combustion air from a distributor 104" to pass from a first side 76" of the tile to a second side 78" of the tile 54" above the platform 80". Elements in FIG. 4 with the same configuration as in FIG. 3 will have the same reference numeral as in FIG. 3. Elements in FIG. 4 which have a different configuration as the corresponding element in FIG. 3 will have the same reference numeral but designated with a double prime symbol ("). FIG. 4 omits illustration of the wind box and fuel line. The configuration and operation of the embodiment of FIG. 4 is essentially the same as in FIG. 3.

The first plurality of pipes 32" are disposed in channels 34" defined by the platform 80". The first plurality of pipes 32" have two ports 28a, 28b per pipe 32" to provide the first plurality of outlets 86". Two small tangential ports 28a on a lateral portion of the pipe 32" direct the combustible mixture of fuel and air onto the platform 80" to provide burner stability. The other port 28b may be provided in a top end of the pipe 32". In an aspect, each pipe 32" in the first plurality of pipes 32" has no more than three ports 28a and 28b.

All other aspects of the configuration and operation of the embodiment of FIG. 4 is essentially the same as in FIG. 3.

Figure 5:
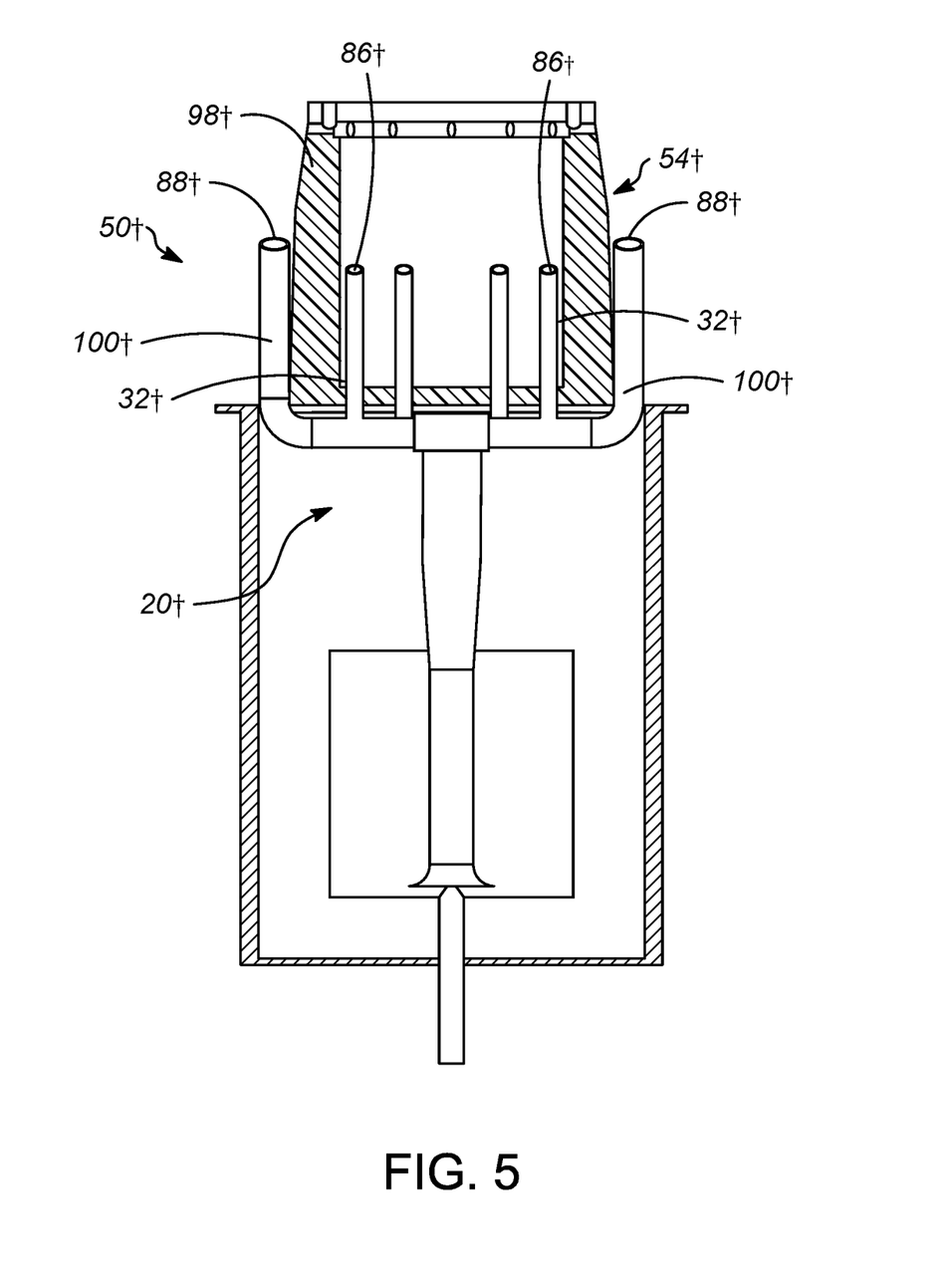
FIG. 5 is an elevational view of an alternative burner to FIG. 4.

FIG. 5 shows an embodiment of the burner 50† in which the tile 54† comprises just an annular tile wall 98†. The first plurality of pipes 32† extend inwardly of the tile wall 98† from the header 20† to provide the first plurality of outlets 86†. The second plurality of pipes 100† extend outwardly of the tile wall 98† from the header 20† to provide the second plurality of outlets 88†. Elements in FIG. 5 are of the same configuration as in FIG. 4 will have the same reference numeral as in FIG. 4. Elements in FIG. 5 which have a different configuration as the corresponding element in FIG. 4 will have the same reference numeral but designated with a cross symbol (†). All other aspects of the configuration and operation of the embodiment of FIG. 5 is essentially the same as in FIG. 4.

Figure 6:
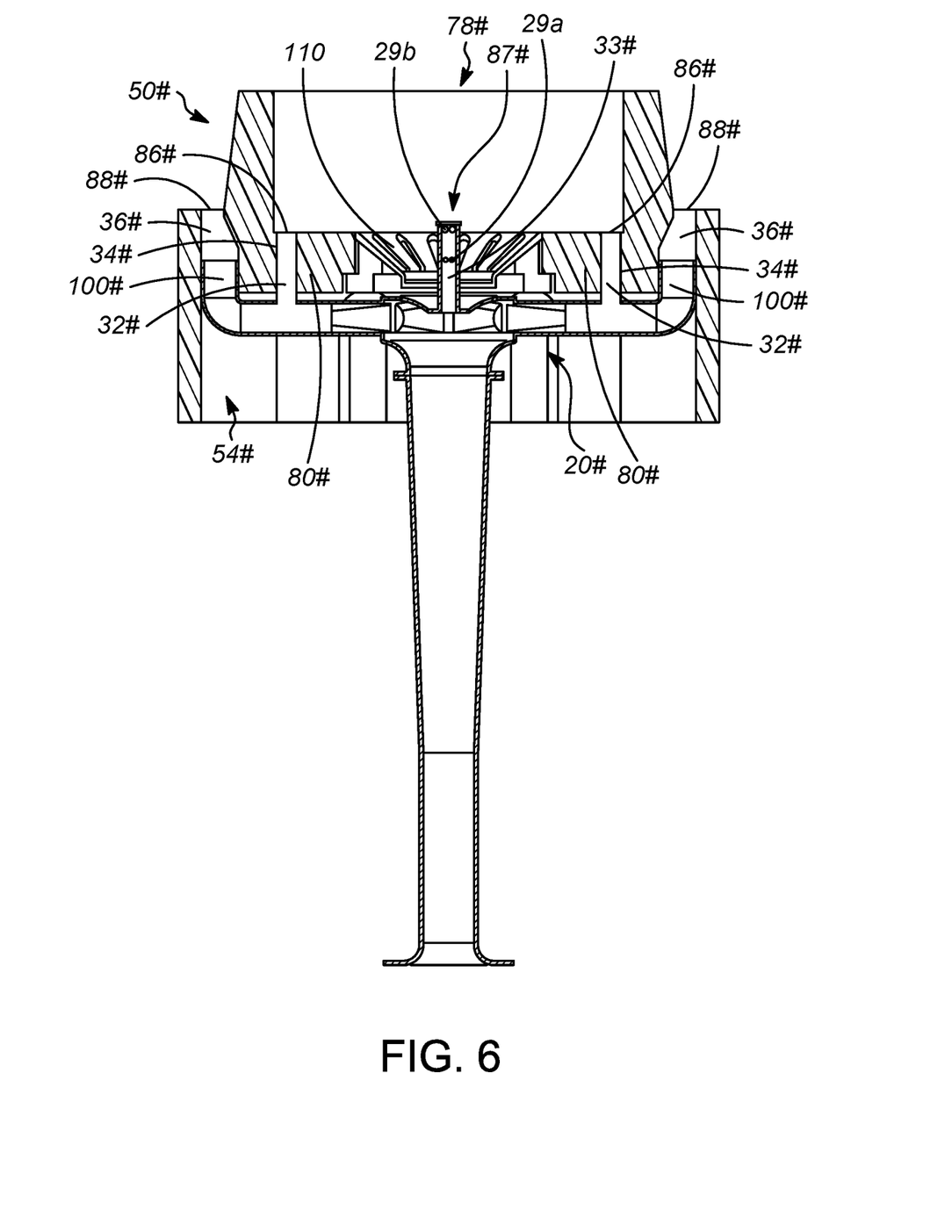
FIG. 6 is cutaway, elevational view of an alternative burner to FIG. 3.

FIG. 6 shows an embodiment of a burner 50# which uses a flame holder 110 for the central pipe 33#. Elements in FIG.
6 are of the same configuration as in FIG. 3 will have the same reference numeral as in FIG. 3. Elements in FIG. 6 which have a different configuration as the corresponding element in FIG. 3 will have the same reference numeral but designated with a cross hatch symbol (#). The wind box and fuel line are omitted from FIG. 6.

The central pipe 33# extends from the header 20# to provide a mixture of fuel gas and combustion air through a plurality of central ports 29a and 29b which provide central outlets 87#. The second plurality of ports 88# are provided in the second side 78# of the tile 54# by channels 36# because the pipes 100# do not extend all the way through the channels 36#.

Radial tabs 80# extend inwardly from the tile wall 98# to provide a first plurality of channels 34# through which pipes 32# extend to provide the first plurality of outlets 86#. Combustion air may pass from the first side 76# to the second side 78# of the tile between tabs 80#. Inner edges of the tabs engage the flame holder 110 to maintain its position. Otherwise, all other aspects of the embodiment of FIG. 6 are very similar in configuration and operation to the embodiment of FIG. 3.

Specific Embodiments

While the following is described in conjunction with specific embodiments, it will be understood that this description is intended to illustrate and not limit the scope of the preceding description and the appended claims.

A first embodiment of the invention is an burner comprising a fuel line having an outlet; a pre-mixer having a first end, a second end, and a wall extending between the first end and the second end, the pre-mixer being in communication with a source of combustion air and fuel from the fuel line; a tile having a first side, a second side, and a tile wall extending away from the first side of the tile; a metal header having an inlet in communication with the second end; and a first plurality of outlets located inwardly of the tile wall and a second plurality of outlets located outwardly of the first plurality of outlets wherein the first plurality of outlets are in communication with the header. An embodiment of the invention is one, any or all of prior embodiments in this paragraph up through the first embodiment in this paragraph wherein the second plurality of outlets are in communication with the header. An embodiment of the invention is one, any or all of prior embodiments in this paragraph up through the first embodiment in this paragraph further comprising a first plurality of channels extending through the tile to define the first plurality of outlets in a second side of the tile and a first plurality of pipes extend from the header, each of the first plurality of pipes extending to a respective one of the first plurality of channels. An embodiment of the invention is one, any or all of prior embodiments in this paragraph up through the first embodiment in this paragraph wherein the first plurality of outlets comprise openings in a pipe extending from the header. An embodiment of the invention is one, any or all of prior embodiments in this paragraph up through the first embodiment in this paragraph further comprising a first plurality of channels extending through the tile to the second side of the tile and each of the first plurality of pipes extending through a respective one of the first plurality of channels. An embodiment of the invention is one, any or all of prior embodiments in this paragraph up through the first embodiment in this paragraph further comprising a second plurality of channels extending through the tile to define the second plurality of outlets in a second side of the tile and the header comprises a plurality of conduits, each of the conduits extending to a respective one of the second plurality of channels. An embodiment of the invention is one, any or all of prior embodiments in this paragraph up through the first embodiment in this paragraph wherein the second plurality of outlets comprise openings in a pipe extending from the header. An embodiment of the invention is one, any or all of prior embodiments in this paragraph up through the first embodiment in this paragraph further comprising a second plurality of channels extending through the tile to the second side of the tile and each of the second plurality of pipes extending through a respective one of the second plurality of channels. An embodiment of the invention is one, any or all of prior embodiments in this paragraph up through the first embodiment in this paragraph further comprising a plurality of third channels extending from the first side to the second side of the tile to communicate the wind box with the second side. An embodiment of the invention is one, any or all of prior embodiments in this paragraph up through the first embodiment in this paragraph further comprising a central channel extending through a center of the tile in communication with the second end. An embodiment of the invention is one, any or all of prior embodiments in this paragraph up through the first embodiment in this paragraph further comprising a wind box having a first end, a second end, and a wall extending between the first end and the second end, the wall of the wind box defining a cavity; the first end of the pre-mixer being an open first end that is located in the cavity and spaced apart from the fuel line, the first side of the tile being adjacent to the second end of the wind box. An embodiment of the invention is one, any or all of prior embodiments in this paragraph up through the first embodiment in this paragraph wherein the header comprises a plurality of radial conduits extending from a central hub in communication with the second end and each of the plurality of radial conduits being in communication with a respective one of the first plurality of openings and a respective one of the second plurality of openings.

A second embodiment is a burner comprising a wind box having a first end, a second end, and a wall extending between the first end and the second end, the wall of the wind box defining a cavity; a fuel line having an outlet in the cavity of the wind box; a metal pre-mixer having an open first end, an second end, and a wall extending between the open first end and the second end, the wall defining a mixing chamber between the open first end and the second end, the open first end of the pre-mixer being spaced apart from the outlet of the fuel line and being configured to receive combustion air from the cavity of the wind box and fuel from the fuel line; a tile having a first side, a second side, a tile wall extending away from the first side of the tile, the first side of the tile being adjacent to the second end of the wind box; and a plurality of metal conduits each having an inlet in communication with the second end; a first plurality of outlets located inwardly of the tile wall and a second plurality of outlets located outwardly of the tile wall wherein each of the first plurality of outlets and each of the second plurality of outlets are in communication with a respective one of the plurality of metal conduits. An embodiment of the invention is one, any or all of prior embodiments in this paragraph up through the second embodiment in this paragraph wherein the first plurality of outlets comprise openings in a first plurality of pipes extending from a respective one of the metal conduits. An embodiment of the invention is one, any or all of prior embodiments in this paragraph up through the second embodiment in this paragraph further comprising a first plurality of channels extending through the tile to define the first plurality of outlets in the second side of the tile and a first plurality of pipes each extending from a respective one of the conduits, each of the first plurality of pipes extending to a respective one of the first plurality of channels. An embodiment of the invention is one, any or all of prior embodiments in this paragraph up through the second embodiment in this paragraph wherein the second plurality of outlets comprise openings in a second plurality of pipes extending from a respective one of the metal conduits. An embodiment of the invention is one, any or all of prior embodiments in this paragraph up through the second embodiment in this paragraph further comprising a second plurality of channels extending through the tile to define the second plurality of outlets in a second side of the tile and each of the radial conduits extending to a respective one of the second plurality of channels.

A third embodiment of the invention is a process for assembling a burner comprising taking a tile having a first side, a second side, a wall extending away from the first side of the tile; inserting a candelabra piece in the tile, the candelabra piece comprising a pre-mixer having an open first end, a second end, and a wall extending between the open first end and the second end, and a plurality of metal conduits each having an inlet in communication with the second end; such that a first plurality of outlets located inwardly of the tile wall and a second plurality of outlets located outwardly of the tile wall are in communication with a respective one of the metal conduits. An embodiment of the invention is one, any or all of prior embodiments in this paragraph up through the third embodiment in this paragraph further comprising affixing a wind box having a first end, a second end, and a wall extending between the first end and the second end, to the first side of the tile such that the first side of the tile is adjacent to the second end of the wind box. An embodiment of the invention is one, any or all of prior embodiments in this paragraph up through the third embodiment in this paragraph wherein the tile has a lower annular wall extending from the first side for receiving the candelabra piece.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A burner comprising:
a fuel line having an outlet;
a pre-mixer having a first end, a second end, and a wall extending between the first end and the second end, the pre-mixer being in communication with a source of combustion air and fuel from the fuel line;
a tile having a first side, a second side, and a tile wall extending away from the first side of the tile;
a metal header having an inlet in communication with said second end; and
a first plurality of outlets located inwardly of said tile wall and a second plurality of outlets located outwardly of said first plurality of outlets wherein said first plurality of outlets are in communication with said header.

2. The burner of claim 1 wherein said second plurality of outlets are in communication with said header.

3. The burner of claim 2 further comprising a first plurality of channels extending through said tile to define said first plurality of outlets in a second side of said tile and a first plurality of pipes extend from said header, each of said first plurality of pipes extending to a respective one of said first plurality of channels.

4. The burner of claim 2 wherein said first plurality of outlets comprise openings in a pipe extending from said header.

5. The burner of claim 4 further comprising a second plurality of channels extending through said tile to said second side of said tile and each of said second plurality of pipes extending through a respective one of said second plurality of channels.

6. The burner of claim 2 further comprising a first plurality of channels extending through said tile to said second side of said tile and each of said first plurality of pipes extending through a respective one of said first plurality of channels.

7. The burner of claim 2 further comprising a second plurality of channels extending through said tile to define said second plurality of outlets in a second side of said tile and said header comprises a plurality of conduits, each of said conduits extending to a respective one of said second plurality of channels.

8. The burner of claim 2 wherein said second plurality of outlets comprise openings in a pipe extending from said header.

9. The burner of claim 2 further comprising a plurality of third channels extending from the first side to the second side of said tile to communicate said wind box with the second side.

10. The burner of claim 1 further comprising a central channel extending through a center of the tile in communication with said second end.

11. The burner of claim 1 further comprising a wind box having a first end, a second end, and a wall extending between the first end and the second end, the wall of the wind box defining a cavity; said first end of said pre-mixer being an open first end that is located in said cavity and spaced apart from said fuel line, the first side of said tile being adjacent to the second end of said wind box.

12. The burner of claim 1 wherein said header comprises a plurality of radial conduits extending from a central hub in communication with said second end and each of said plurality of radial conduits being in communication with a respective one of said first plurality of openings and a respective one of said second plurality of openings.

13. A burner comprising:
a wind box having a first end, a second end, and a wall extending between the first end and the second end, the wall of the wind box defining a cavity;
a fuel line having an outlet in the cavity of the wind box;
a metal pre-mixer having an open first end, an second end, and a wall extending between the open first end and the second end, said wall defining a mixing chamber between the open first end and the second end, the open first end of the pre-mixer being spaced apart from the outlet of the fuel line and being configured to receive combustion air from the cavity of the wind box and fuel from the fuel line;
a tile having a first side, a second side, a tile wall extending away from the first side of the tile, the first side of the tile being adjacent to the second end of the wind box;
a plurality of metal conduits each having an inlet in communication with said second end; and
a first plurality of outlets located inwardly of said tile wall and a second plurality of outlets located outwardly of said tile wall wherein each of said first plurality of outlets and each of said second plurality of outlets are in communication with a respective one of said plurality of metal conduits.

14. The burner of claim 13 wherein said first plurality of outlets comprise openings in a first plurality of pipes extending from a respective one of said metal conduits.

15. The burner of claim 13 further comprising a first plurality of channels extending through said tile to define said first plurality of outlets in said second side of said tile and a first plurality of pipes each extending from a respective one of said conduits, each of said first plurality of pipes extending to a respective one of said first plurality of channels.

16. The burner of claim 13 wherein said second plurality of outlets comprise openings in a second plurality of pipes extending from a respective one of said metal conduits.

17. The burner of claim 13 further comprising a second plurality of channels extending through said tile to define said second plurality of outlets in a second side of said tile and each of said radial conduits extending to a respective one of said second plurality of channels.

\* \* \* \* \*